Sept. 27, 1927.　　　　S. G. GREEN　　　　1,643,491
MOUNT FOR GUNS
Filed April 21, 1927
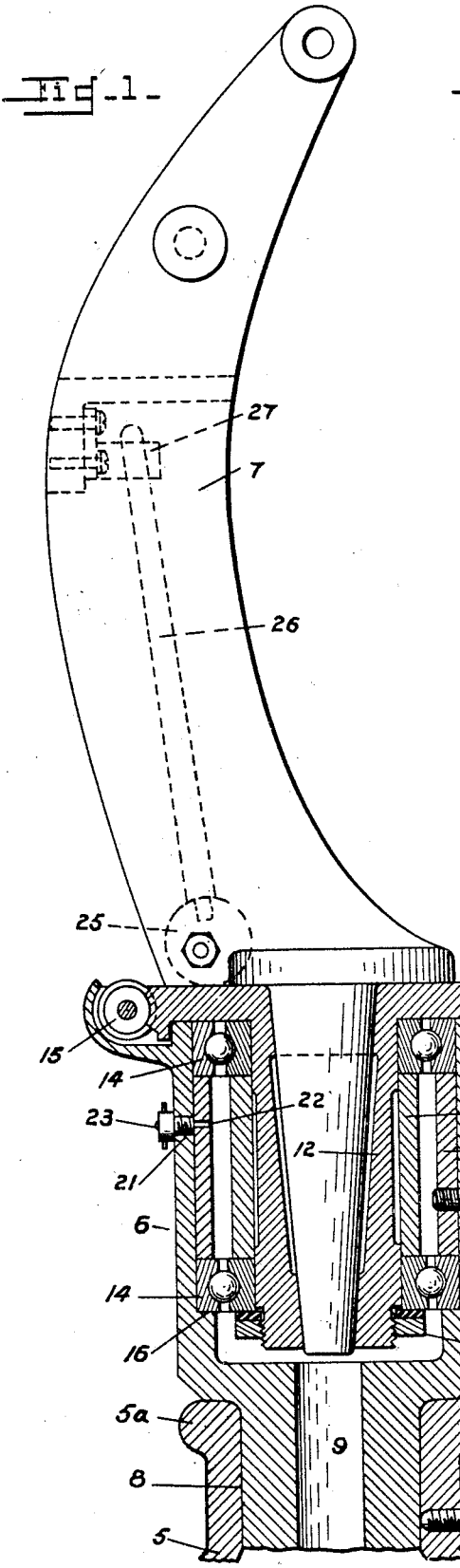
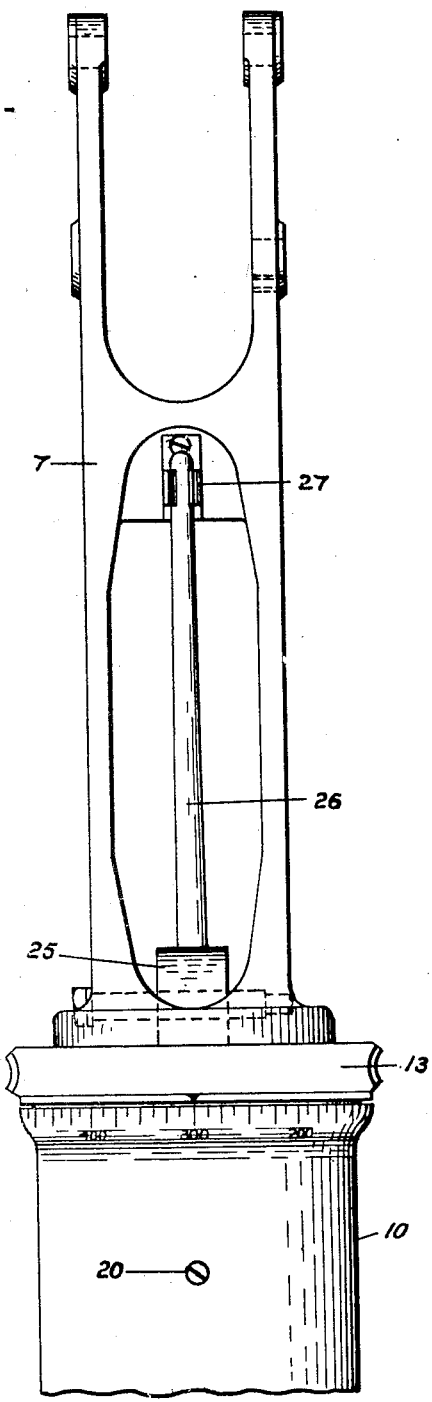
Inventor
Samuel G. Green
W. N. Roach
Attorney Patented Sept. 27, 1927.

1,643,491

UNITED STATES PATENT OFFICE.

SAMUEL G. GREEN, OF GRAY, GEORGIA.

MOUNT FOR GUNS.

Application filed April 21, 1927. Serial No. 185,583.

(GRANTED UNDER THE ACT OF MARCH 3, 1883; 22 STAT. L. 625.)

The invention described herein may be used by the Government, or any of its officers or employees in prosecution of work for the Government, or by any other person in the United States, without payment to me of any royalty thereon, in accordance with the act of March 3, 1883.

The subject of this invention is a mount for guns.

Mounts for the lighter anti-aircraft weapons such as the .30 and .50 caliber machine guns attain considerable weight for the purpose of affording stability, and because they must possess the mobility of the weapon it is necessary to divide them into convenient loads for individual transportation. By reason of the general construction of these mounts the only practical divisions are few and involve separation of a rotatable standard from a bearing member.

Heretofore the bearing member has been in direct contact with the rotatable standard and inasmuch as the latter becomes very readily fouled its functioning is soon impaired.

Accordingly the principal object of this invention is to provide a knock-down mount in which the socket member is rotatable on a concealed lubricated bearing in which the standard bears and means for disengaging it from the socket member.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a view partly in longitudinal section and side elevation of the upper structure of a gun mount;

Fig. 2 is an end view.

Referring to the drawing by numerals of reference:

The mount is composed of three units namely a base 5 which may be of the tripod or pedestal type, a socket adaptor 6 and a gun carrying standard 7. The head 5ª of the base is formed with a central opening 8 for receiving the stem 9 of the adaptor 10 and carries screws 11 for engaging the stem to hold the adaptor stationary.

Within the adaptor is the socket or bearing member 12 formed with a cap plate 13 overlying the rim of the adaptor and rotatably supported on bearings 14—14. The rim of the cap plate is geared and is in engagement with a worm 15 mounted in the adaptor.

The lower bearing is seated on a shoulder 16 on the internal wall of the adaptor and on a nut 17 threaded on the lower extremity of the socket member. For convenience in assembly the upper bearings rest on an inner spacer 18 and an outer spacer 19 both supported on the lower bearing and the outer spacer fixed with respect to the adaptor by means of retaining studs 20. A threaded opening 21 in the adaptor in alinement with an opening 22 in the outer spacer is provided for the reception of a fitting 23 whereby lubricant may be admitted to the bearings.

Between the arms of the standard is an eccentrically mounted cam 25 to which is secured an actuating handle 26 arranged when the cam is in inoperative position to be secured within the standard by a spring clip 27.

Division of the mount to form individual loads may be accomplished with facility as the only operations required to disengage the units will be to act on the handle 26 and screws 11.

I claim:

1. A mount for guns including a base, an adaptor removably inserted in the head of the base, a socket member extending within the adaptor, bearings for the socket member disposed between it and the adaptor, means for admitting lubricant to the bearings, a standard insertable in the socket member and a cam member carried by the standard and engageable with the socket member for disengaging the standard.

2. A mount for guns including a base, an adaptor removably inserted in the head of the base, a socket member extending within the adaptor, bearings for the socket member disposed between it and the adaptor, a standard insertable in the socket member and a cam member carried by the standard and engageable with the socket member for disengaging the standard.

3. A mount for guns including a base, an adaptor removably inserted in the head of the base, a socket member extending within the adaptor, bearings for the socket member disposed between it and the adaptor, a standard insertable in the socket member and means carried by the standard for disengaging it from the socket member.

4. A mount for guns including a base, an adaptor assembly inserted in the head of the base, a rotatable socket member extending within the adaptor, concealed bearings for the socket member and a standard removably carried by the socket member.

5. A knock down mount for guns embodying a base, an adaptor including a rotatable socket member carried by the base and a standard removably carried by the socket member.

SAMUEL G. GREEN.